United States Patent [19]

Field et al.

[11] Patent Number: 5,430,725

[45] Date of Patent: Jul. 4, 1995

[54] TRANSMITTING DIFFERENT SIZE DATA ITEMS ON A BUS

[75] Inventors: Anthony V. Field; John M. Blackburn, both of Wiltshire, Great Britain

[73] Assignee: Cray Communications Limited, Berkshire, Great Britain

[21] Appl. No.: 294,725

[22] Filed: Aug. 22, 1994

Related U.S. Application Data

[63] Continuation of Ser. No. 981,939, Nov. 23, 1992, abandoned.

[30] Foreign Application Priority Data

Nov. 23, 1991 [GB] United Kingdom ............ 9124915

[51] Int. Cl.$^6$ ............................................. H04J 3/16
[52] U.S. Cl. ............................................. 370/85.7
[58] Field of Search ............. 370/85.7, 94.1, 110.01, 370/94.2, 84, 95.1

[56] References Cited

U.S. PATENT DOCUMENTS 4,763,319 8/1988 Rozenblit ..................... 370/85.7
5,001,703 3/1991 Johnson et al. ................. 370/84
5,130,982 7/1992 Ash et al. ..................... 370/85.7
5,140,587 8/1992 Mueller et al. ................ 370/110.1

Primary Examiner—Douglas W. Olms
Assistant Examiner—Min Jung
Attorney, Agent, or Firm—Young & Thompson

[57] ABSTRACT

A method of communicating different size items of information between terminals via channels of a time-division-multiplexed parallel bus (1) operating with a predetermined frame period (F) divided into a predetermined number of time slots. Each terminal transmits the whole of each of first size items in a respective separate first time slot and transmits the whole of each of second size items larger than the first size items each in a respective group of consecutive second time slots (M, M+1) in each frame. Preferably, the first time slots (N) are uniformly spaced apart so as to occur at a frequency which is multiple of the frame frequency. Preferably, the second size items are transmitted in two or more groups (M, M+1) of consecutive second time slots within each frame, said two or more groups being uniformly spaced apart.

9 Claims, 3 Drawing Sheets

TRANSMITTING DIFFERENT SIZE DATA ITEMS ON A BUS

This application is a continuation of application Ser. No. 07/981,939, filed Nov. 23, 1992, now abandoned.

TECHNICAL FIELD

This invention relates to a method of, and a system for, communicating different size items of information between terminals via channels of a time-division-multiplexed parallel bus.

Digital information is transmitted over a time-division-multiplexed (TDM) parallel bus within slots of a time frame defined by a clock signal on the bus. Each slot can carry a predetermined number of bits corresponding to the number of parallel conductors of the bus that are used for communicating the information, this number being referred to as the bus width w. A single slot in a time frame running at a frequency f, therefore serves as a communication channel with a bandwidth of wf bits per second. In order that the bus operates at maximum efficiency, a complete item of information occupies each slot; so each item has a size equal to the slot width w, and information is transferred at the maximum rate of wf bits per second. The maximum delay across the bus is then equal to the frame period F.

If it is required to transfer information between terminals at higher rates, it is also known to employ more than one slot per frame for the same communications channel.

If it is required to transfer information between terminals at lower rates, it is also known to employ an additional clock signal on the bus which divides the frames into consecutive groups of a predetermined number of frames so that a slot in one or more of the frames within a group can be used to form a communication channel of the desired capacity to match the lower information transfer rate. A group of frames within this system is known as a superframe or multi-frame.

A problem arises with these known TDM parallel bus communications system if it is desired to transfer information items of different sizes, for example, information item sizes of 8 bits and 16 bits. Employing a bus with a bus width w equal to the size of the largest information item, involves extra equipment cost and a reduction in efficiency of operation when slots are used to transfer the smaller size items of information. Alternatively, techniques which involve segmentation of the larger items of information into smaller segments for transfer in successive frames on the bus will involve complications of equipment and control and will increase the delay across the bus because of the time involved in reassembling segments.

DISCLOSURE OF THE INVENTION

An object of the present invention is to provide a TDM parallel bus communications system which can handle different size items of information in an efficient manner.

This is achieved according to the present invention by transmitting the whole of each of first size items within one of a set of time slots of each frame, and transmitting the whole of each of second size items larger than said first size items within a group of consecutive ones of time slots of each frame.

By transferring larger size information items in consecutive time slots, the delay across the bus is kept to the maximum of the frame period F. Furthermore, it is a simple matter to use a register to receive the bits from consecutive time slots as a string of bits so that the original larger information item is received without involving any further processing.

Two or more groups of consecutive time slots may be employed within each time frame for the transfer of said second size items, and preferably these are uniformly spaced apart so as to occur at a multiple of the frame frequency, thereby reducing the delay on the bus.

Furthermore, different sets of groups of consecutive time slots may be employed, each to transfer information items of a different size.

Assuming that the information item sizes are all integral multiples of the slot width w, and that the information transfer rates for all the information items of different sizes are the same, then the number of slots of said set used for the first size items (i.e. the smallest items) will be related to the number of groups of consecutive slots used for each larger size item; in particular the number of slots of said set is preferably the lowest common multiple of the numbers of groups in each set of groups. The slots used for the smallest items and the groups of slots used for each of the larger items preferably occur at a multiple of the frame frequency. However, the frequency may be multiplied by an integral factor for any particular item size in order to increase the information transfer rate for these items.

DESCRIPTION OF THE DRAWINGS

The invention will now be described by way of example with reference to the accompanying drawings in which.

Figure 1:
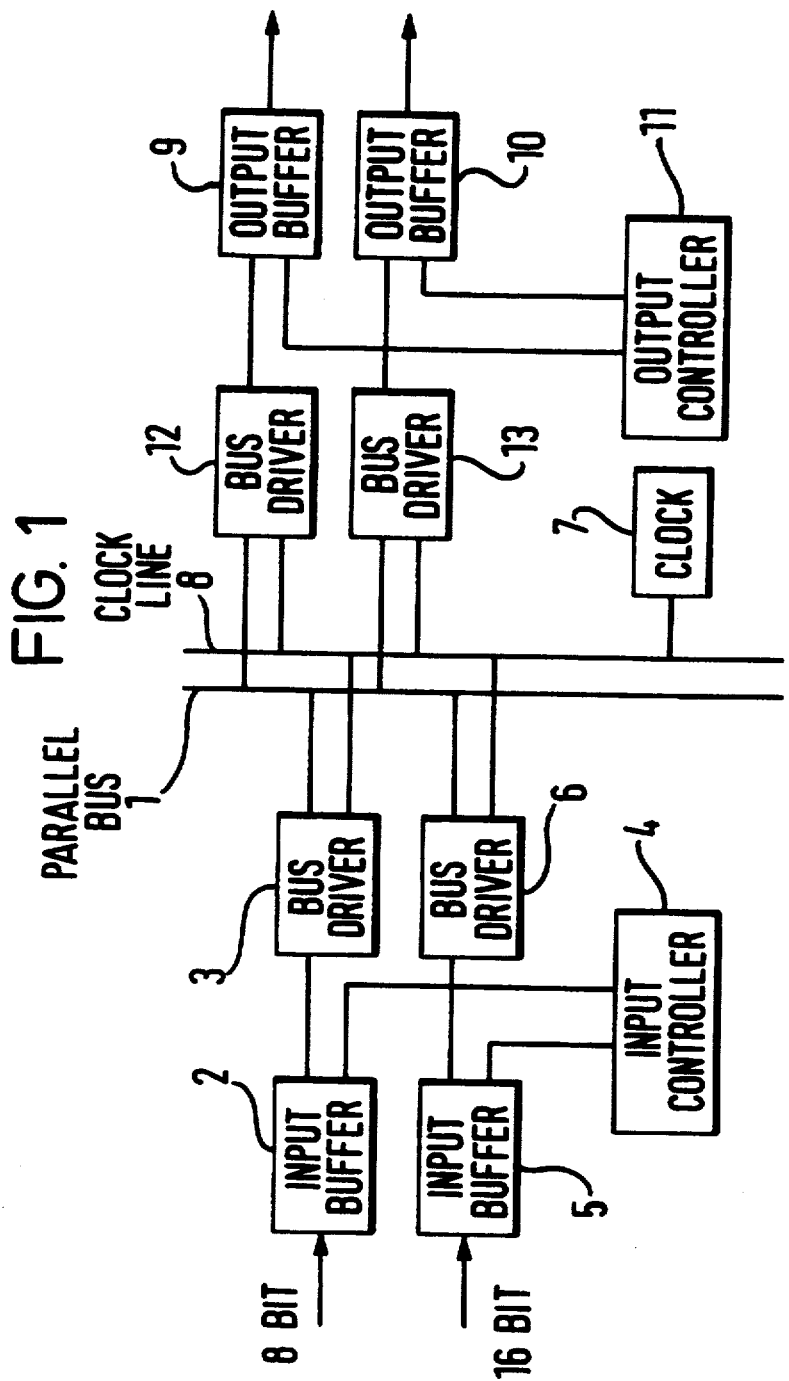
FIG. 1 is a schematic diagram of a communications system according to the invention.

The communications system of FIG. 1 is adapted to allow data to be transmitted across a parallel bus 1 between different inputs and outputs, as different size items of information. For example, 8 bit bytes of information are received at an input buffer 2 at a rate of 8 kHz and are outputted via a bus driver 3 to the bus 1 under the control of an input controller 4. Additionally, 16 bit items of information are received at an input buffer 5 at a rate of 4 kHz and are outputted via a bus driver 6 to the bus 1 under the control of the same input controller 4 controlling the output of buffer 2.

Figure 2:
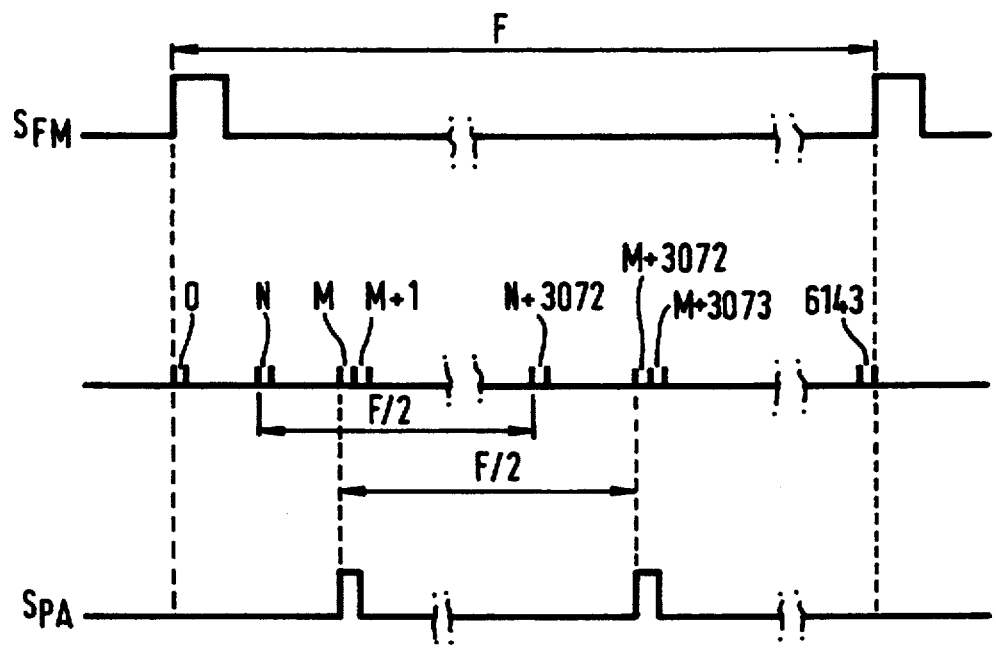
FIG. 2 is a schematic diagram showing marker signals and the time slot sequence for the system of FIG. 1.

The bus 1 itself is 8 bits wide and data is transmitted on it within the slots of a time frame defined by a 4 kHz frame marker signal $S_{FM}$ generated by a clock 7 and applied to a clock line 8 of the bus. Typically, each frame is divided into 6144 time slots, and all of the input and outputs to the bus 1 are synchronised to this slotted frame format by reference to the frame marker signal $S_{FM}$. The frame marker signal $S_{FM}$ and the division of the associated frame into time slots 0 to 6143 is shown in FIG. 2.

The input controller 4 controls the allocation of the time slots for the transmission of 8 bit and 16 bit items of information from the input buffers 2 and 5, respectively.

The 8 bit items are allocated pairs of time slots which are spaced apart at half the frame period F, for example, slots N and N+3072, so that successive 8 bit bytes are equispaced in time and are transmitted at an effective rate of 8 kHz. The 16 bit items, however, are allocated a pair of consecutive time slots within each frame, for example, slots M and M+1, so that each 16 bit item is transmitted as two consecutive 8 bit bytes at a rate of 4 kHz.

In allocating the time slots for the transmission of 8 bit and 16 bit items, the input controller is adapted to avoid conflict between the two types of slot allocation. In particular, it will be appreciated that once a consecutive pair of slots such as M and M+1 has been allocated for 16 bit items, the consecutive pair of slots M+3072 and M+3073 occurring within the time frame at an interval F/2 thereafter, cannot be allocated for anything other than 16 bit items of information without causing conflict.

The 8 bit and 16 bit items of information are received from the bus 1 by output buffers 9 and 10, respectively, both under the control of an output controller 11 which shares the slot allocation information with the input controller 4. In fact, the output connections, between the bus 1 and output buffers 9, 10 also include bus drivers 12, 13, and both the input and output buffers 2, 5 and 9, 10, and the input and output controllers 4 and 11 are configured so that each can operate alternatively as an input or output device in transmitting corresponding data in either direction across the bus 1.

Figure 3:
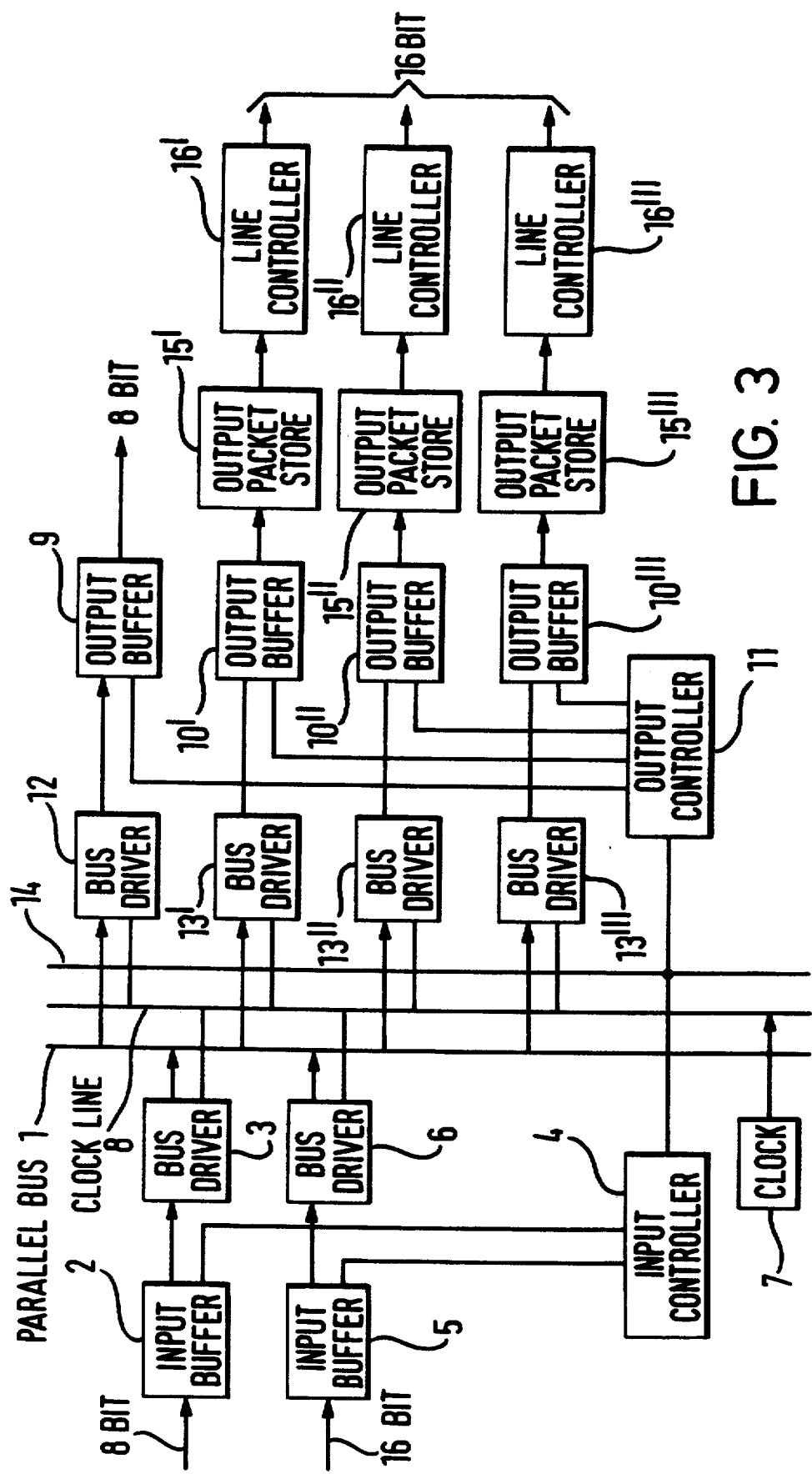
FIG. 3 is a schematic diagram of a particular example of the system of FIG. 1 as used in a packet switching node.

The particular example of the invention shown in FIG. 3 is generally similar to that of FIG. 1, and the same reference numerals have therefore been used for similar parts. The 8 bit items of information supplied to input buffer 2 correspond to circuit switched information which it is required to transmit across the bus to the output buffer 9 for onwards transmission with the minimum delay. The F/2 time interval between successive 8 bit bytes gives a maximum delay across the bus of F/2=125 microseconds.

Figure 4:
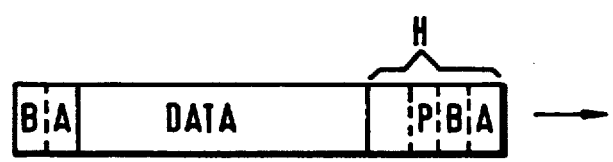
FIG. 4 is a diagram showing the packet format of a packet in the system of FIG. 3.

The 16 bit items of information supplied to input buffer 5 correspond to packet information, each packet, as shown in FIG. 4, having a header H including an output address AB which identifies one of a plurality of similar output buffers 10', 10", 10''' for which it is intended. Each packet consists of a plurality of 8 bit bytes, and the output address consists of 16 bits contained in two consecutive bytes. All of the bytes of each packet are transmitted across the bus in a particular consecutive pair of time slots such as M and M+1 allocated by the controller 4, as described in relation to FIGS. 1 and 2. In particular, the 16 bit output address is transmitted within said consecutive pair of time slots in one frame so that this address is transmitted as a whole and not split between two frames.

Every time the input buffer 2 applies an output address to the bus 1, the input controller 4 applies a packet address marker $S_{PA}$ to a further line 14 of the bus which in turn is connected to the output controller 11. This packet address marker $S_{PA}$, as shown in FIG. 2, serves to identify the presence of each and every packet on the bus 1, and triggers the output controller 11 which causes all of the output buffers 10', 10" and 10''' to be set to read the 16 bit output address AB of the associated packet. That output buffer 10', 10" or 10''' which recognises the output address as its own, is triggered to receive the whole of that packet, which it then passes to the corresponding output packet store 15', 15" or 15'''.

The maximum delay in transmitting a packet across the bus is equal to the period F=250 microseconds between said consecutive pairs of time slots M and M+1 in successive frames. This is a longer delay than for the 8 bit items of information transmitted between the buffers 2 and 9; however, this longer delay is still generally acceptable, and will be non-critical in many applications such as computer to computer data transmission and interactive data communications. Additionally, the advantages of using an 8 bit wide bus and 8 bit bus drivers to transmit 16 bit items of information is significant in terms of lower equipment costs and lower power requirements.

Packets transmitted across the bus may be of variable length, in which case the output buffers 10', 10" and 10''' detect the end of each packet by means of an end of packet marker which the packet incorporates, possibly in the form of a repeat of the output address.

The bus illustrated in FIG. 3 may form the basis of a packet switching node for a packet switching network in which packet data is transmitted between nodes in a standard fixed frame format known as frame relay. Packets are routed through the network in accordance with a logical address which is incorporated in the packet header and which is used to route the packet across the bus 1 of each node. The logical address is employed by the input controller 4 of the node to set the output address AB of the packet so that this will be routed across the bus to the appropriate output buffer 10', 10" or 10''' for onwards transmission to the next node.

The output packet store 15', 15" or 15''' associated with each output buffer is adapted to store the output packets in one of a plurality of priority queues depending on the setting of a priority bit P in the packet header. The packets in these queues are then selectively outputted via line controllers 16', 16" or 16''' to transmission means which interconnect with other nodes in the network.

We claim:

1. A method of transmitting different size data units between terminals via channels of a time division multiplexed parallel bus operating with a predetermined frame period divided into a predetermined number of consecutive time slots; the method comprising transmitting each of different size data units in a separate transmission channel comprising one or more predetermined time slots in predetermined positions in each frame, and allocating a plurality of consecutive time slots in each frame for every channel that is to transmit data units larger than one time slot.

2. A method as claimed in claim 1, in which the time slots of a first channel that is to transmit first size data units no greater in size than the capacity of one slot are uniformly spaced apart so as to occur at a frequency which is a multiple of the frame frequency.

3. A method as claimed in claim 1, in which a second channel that is to transmit second size data units larger than the capacity of one time slot comprises two or more groups of time slots that are spaced apart in each frame and each group comprises a plurality of consecutive time slots.

4. A method as claimed in claim 3, in which said groups of time slots are uniformly spaced apart so as to occur at a frequency which is a multiple of the frame frequency.

5. A method as claimed in claim 1, in which the size of first size data units equals the slot width of the bus.

6. A method as claimed in claim 1, in which the size of second size data units is an integral multiple of the size of said first size data units, and the number of consecutive time slots in each group is equal to this integral multiple.

7. A method as claimed in claim 6, in which the bit rate capacity of a first channel is equal to the bit rate capacity of a second channel.

8. A parallel bus communication system for communicating different size data units between terminals connected to the bus comprising clock means that generates a clock signal on the bus that the terminals employ to communicate with one another in a time division multiplexed mode of a predetermined frame length divided into a predetermined number of time slots; transmitting means within each terminal for transmitting each of different size data units in a separate transmission channel comprising one or more predetermined time slots in predetermined positions in each frame, a plurality of consecutive time slots being allocated in each frame for every channel that is to transmit data units larger than one time slot; and receiving means within each terminal for receiving said data units from each of said predetermined time slots.

9. A system as claimed in claim 8, in which the receiving means comprises a register to receive successive portions of each data unit allocated to a plurality of consecutive time slots arriving at the terminal.

* * * * *